US010868724B2

(12) United States Patent
Rzezak et al.

(10) Patent No.: US 10,868,724 B2
(45) Date of Patent: Dec. 15, 2020

(54) METHOD AND SYSTEM FOR SELF-PROVISIONING OF CABLE MODEMS AND MULTIMEDIA TERMINAL ADAPTERS

(71) Applicant: Intraway R&D S.A., Montevideo (UY)

(72) Inventors: Leandro Rzezak, Miami, FL (US); Martin Claro, Buenos Aires (AR)

(73) Assignee: Intraway R&D SA, Montevideo (UY)

( * ) Notice: Subject to any disclaimer, the term of this patent is extended or adjusted under 35 U.S.C. 154(b) by 0 days.

(21) Appl. No.: 15/937,099

(22) Filed: Mar. 27, 2018

(65) Prior Publication Data

US 2018/0287874 A1 Oct. 4, 2018

Related U.S. Application Data

(60) Provisional application No. 62/477,704, filed on Mar. 28, 2017.

(51) Int. Cl.
| | |
|---|---|
| *H04L 5/16* | (2006.01) |
| *H04L 12/24* | (2006.01) |
| *H04L 29/12* | (2006.01) |
| *H04L 12/28* | (2006.01) |
| *H04L 29/06* | (2006.01) |

(Continued)

(52) U.S. Cl.
CPC ........ *H04L 41/0886* (2013.01); *G06F 21/602* (2013.01); *H04L 12/2856* (2013.01); *H04L 41/0213* (2013.01); *H04L 41/0806* (2013.01); *H04L 41/5087* (2013.01); *H04L 61/1511* (2013.01); *H04L 61/2015* (2013.01); *H04L 63/10* (2013.01); *H04L 63/1483* (2013.01); *H04L 67/02* (2013.01); *H04L 67/06* (2013.01); *H04L 67/2814* (2013.01)

(58) Field of Classification Search
CPC . H04M 11/06; H04M 11/062; H04L 25/4927; H04L 63/0853; H04L 63/0227
USPC .............. 375/222, 224; 709/225, 229; 726/1
See application file for complete search history.

(56) References Cited

U.S. PATENT DOCUMENTS

| | | |
|---|---|---|
| 9,258,237 B1 | 2/2016 | Smith |
| 2006/0031921 A1 | 2/2006 | Danforth et al. |
| | (Continued) | |

OTHER PUBLICATIONS

Partial European Search Report for EP 18164765.2 dated Jul. 20, 2018.

(Continued)

*Primary Examiner* — Khai Tran
(74) *Attorney, Agent, or Firm* — Peter A. Nieves; Sheehan Phinney Bass & Green PA

(57) ABSTRACT

An unregistered cable modem is in a cable operator network having a computer, a dynamic host configuration protocol (DHCP) server, a spoofing domain name system (DNS) server and a good DNS server, a captive portal application, and a trivial file transfer protocol (TFTP) server. The cable modem is provisioned by the cable modem obtaining a configuration, rebooting, and activating the configuration. The computer obtains a plurality of computer configuration parameters including an IP address of the spoofing DNS. The spoofing DNS server answers an HTTP request from the computer with an IP address associated with the captive portal application. The captive portal obtains an activation code from the computer, verifies the activation code is correct, and forces the cable modem to reboot.

7 Claims, 5 Drawing Sheets

(51) Int. Cl.
*H04L 29/08* (2006.01)
*G06F 21/60* (2013.01)

(56) References Cited

U.S. PATENT DOCUMENTS

| | | | |
|---|---|---|---|
| 2006/0059092 A1* | 3/2006 | Burshan | H04L 29/06 |
| | | | 705/51 |
| 2008/0084870 A1 | 4/2008 | Taylor | |
| 2009/0238349 A1 | 9/2009 | Pezzutti | |
| 2012/0096160 A1 | 4/2012 | Datla et al. | |
| 2015/0295885 A1* | 10/2015 | Congdon | H04L 61/2557 |
| | | | 370/392 |
| 2016/0337373 A1* | 11/2016 | Tseng | H04L 63/102 |
| 2017/0041965 A1* | 2/2017 | Watanabe | H04W 76/10 |
| 2018/0159825 A1* | 6/2018 | Segal | H04L 63/0227 |

OTHER PUBLICATIONS

Netgear High Speed Cable Modem, Model CM1000 User Manual; Sep. 2016.
European Search Report for EP 18164765.2 dated Sep. 21, 2018.
CableLabs; PacketCable 1.5 Specification MTA Device Provisioning PKT-SP-PROV1.5-I04-090624, dated Jun. 24, 2009.

* cited by examiner

METHOD AND SYSTEM FOR SELF-PROVISIONING OF CABLE MODEMS AND MULTIMEDIA TERMINAL ADAPTERS

CROSS-REFERENCE TO RELATED APPLICATIONS

This application claims the benefit of U.S. Provisional Patent Application Ser. No. 62/477,704, filed Mar. 28, 2017 entitled "Self-provisioning of cable modems and multimedia terminal adapters," which is incorporated by reference herein in its entirety.

FIELD OF THE INVENTION

The present invention relates generally to the means that a cable operator can use to automatically provision cable modems and multimedia terminal adapters.

BACKGROUND OF THE INVENTION

A cable operator provides services to its subscribers. These services include but are not limited to broadband access to the internet and telephony. In order to consume these services, clients may buy subscriptions or subscription plans from the cable operator. The cable operator prepares a cable that goes from its network to the subscriber's address, and the subscriber connects a terminal to the cable operator's network. In general three types of terminals are of interest to this disclosure: a) a cable modem (CM), which allows the subscriber to connect a personal computer or access point to the internet, b) a multimedia terminal adapter (MTA) which allows the subscriber to connect a (standard) phone to the cable operator's network, and c) an eMTA or embedded MTA which is a combination of the cable modem and the MTA.

Cable modems, MTAs and eMTAs may be obtained from the cable operator and otherwise, for example, they may be purchased in an electronics store or even a supermarket. Sometimes, there is a physical connection from the cabled network to a home which has no ongoing subscription, for example, because there was a subscription at that address in the past, or because the builder of the home or apartment had it installed. However, if the home owner buys a cable modem and connects it to the network, he will not get broadband access nor a telephone line. The cable operator needs to provide access for this to happen.

A conventional method for providing access to a subscription plan with a network terminal (MTA, eMTA or cable modem) is to provision cable modems, MTAs and eMTAs when they reach the subscriber. Here, a technician, acting on behalf of the cable operator, sets aside a network terminal for this subscription (a cable modem, MTA or eMTA); and he uploads a configuration file with the subscription details for the subscriber (for example, it is tailored to have the upstream and downstream bitrates specified in the subscription) to the network terminal. He also takes down the MAC address of this network terminal and the subscription identifier (ID). The operator then associates the network terminal with the subscription ID at the cable operator's infrastructure. The service can be activated immediately, or at a later step after the subscriber or a technician validates the service levels for the connection.

When any one of the cable modem, MTA or eMTA devices is connected to the network for the first time, and each time it boots, the device registers to the network. Once the registration finishes, the device gets access to the subscription services and is considered activated or registered.

In general, when a cable modem boots, the following protocol is executed:
Step A: The cable modem performs a ranging negotiation with the Cable Modem Termination System (CMTS) to get at least one upstream channel and one downstream channel.
Step B (DOCSIS registration):
a) The CM executes a handshake against the DHCP server. It can be a DORA (Discovery, Offer, Request and Acknowledge) in the case of an IPv4 network or a Solicit-Reply in the case of IPv6. In the end, the CM obtains an IP address and other configuration parameters, including but not limited to, a subnet mask, gateway's IP address, proprietary options (for example, options that enable or disable functionalities in the device), a TFTP IP address, a configuration filename, and (if this is an eMTA) the IP address of the eMTA's DHCP server which may be different from the cable modem's DHCP server.
b) The CM requests the configuration file from the TFTP server using the TFTP IP address and filename that it received from the DHCP. Filenames may be human-readable (e.g., the concatenation of subscription plan name, device vendor and model), or in any case guessable strings. The TFTP looks for a file with this name in its filesystem and returns it. The CM downloads and enables this configuration.
c) The CM completes the DOCSIS registration after receiving an acknowledgment from the CMTS.
Step C:
a) Handshake between PC and DHCP server (DORA or Solicit-Reply). This step is analogous to the handshake between CM and DHCP server.
b) The PC is now connected to the internet with the capabilities underlying the subscription plan. In particular, when the PC makes any HTTP request to ports 80 or 443, the DNS server answers with the information necessary to construct the IP address for this URL.

The provisioning process for an MTA or eMTA is similar to the provisioning of a cable modem, but provision for an MTA adds a DOCSIS registration of the MTA after the cable modem DOCSIS registration, and can be found in the Cablelabs specification (["PacketCable 1.5 Specification—MTA Provisioning (PKT-SP-PROV1.5-I04-090624)" by PacketCable]), which is incorporated by reference herein in its entirety.

These provisioning processes have some deficiencies. For example, in order for a network terminal to be registered, the cable operator executes a provisioning and registration process in which it adds the MAC address of the cable modem to a subscriber table in the database. He also links this parameter with the subscriber ID and his subscription plan, and may create additional information in order to start providing broadband and telephony services. In particular, the cable operator may ensure that the services underlying a subscription plan hired by one subscriber are linked to the cable modem (or MTA or eMTA) which is given to this subscriber. Once the cable modem is working, the MAC address acts as the sole way to identify the cable modem to the cable operator's network.

In order to facilitate the provisioning process, a team within the cable operator performs the following procedure. Each day the cable operator prepares a list of its new subscribers. For each subscriber it must generate a configuration file that implements the subscription plan hired by the subscriber. The cable operator then uploads each configuration file to a new cable modem, MTA or eMTA; takes down its MAC address; and adds a line to its database. Next, the cable operator delivers the network terminal to the subscriber. For example, a technician can go to the subscriber's address and install the network terminal and make sure the subscription services are available.

The cable operator should expect that the service levels satisfy minimal requirements before the subscriber is granted access to its network. For example, if the service levels are not as expected at some later point, then the subscriber may complain and the cable operator will need to send a technician to fix this. This visit adds to the cable operator's costs.

During the installation visit (and afterward), the technician may verify quality levels as follows. The cable modem is connected to the network and a personal computer (PC) on the other side and opens a specific URL in a web browser that runs in this computer. The browser connects to a service web application (for example, owned by the cable operator) which estimates the value of some service level parameters and displays this information in the browser. If the validation is passed, then the technician can call a service number from his phone and ask them to activate the service. (If the validation is not passed, then the technician needs to attend the issue; e.g., first check if the problems arise in the "last hop" of the physical connection and he can fix them, or if he needs to call the cable operator and ask another technician to fix the values in an equalizer, an amplifier or any other device in the network between the last hop and the CMTS. Once the problem is fixed, he needs to reconnect to this service application, re-check the values and only activate when they match the cable operator's expectations.)

This methodology has several problems. Representatives for the cable operator must execute several tasks before the cable modem is delivered: i) configure the cable modems to include the subscription parameters specific to subscriber and subscription, ii) take down the MAC address of this cable modem, iii) insert an entry in a database linking the MAC address with the subscription, iv) find the information and print a sticker for the cable modem's box which identifies the subscriber and his address, v) Gather together all the CM boxes for a technician before he leaves the cable operator's premises. All these tasks take a lot of time and resources from the cable operator.

This methodology requires a technician, or at least a courier, to deliver the CM corresponding to each subscriber. It also requires an interactive voice response (IVR) or call center to handle activation phone calls for every cable modem activation.

If the cable modem is installed by a technician and it is either broken or for some reason it does not work, the technician cannot replace the cable modem by an arbitrary cable modem. He either needs to have provisioned a second cable modem in case the first CM doesn't work (which doubles the time and resources described above), or he needs to pack unassigned cable modems representing all (or most of) the configurations, use the appropriate CM with the user and then call the cable operator offices so that they reassign the new CM to the subscription in replacement of the non-working CM. This mechanism has lots of problems, in that it requires the cable operator to keep many spare CMs with each technician, it creates inventory and traceability problems, among other possible problems.

If the CM is lost or stolen, it cannot be un-provisioned. To mitigate this problem, the cable operator can check his inventory, find out which CM was stolen, get its MAC address, remove it from the devices table (therefore deactivating the subscription), redeliver a new CM and replace the MAC address of the stolen CM with the MAC address of the new one in the database which associates cable modems with subscriptions.

If no technician visits the subscriber, the cable operator cannot check the service levels before activating the CM. Either it is activated before it arrives to the subscriber, or the subscriber must interact with the cable operator (e.g., over the telephone) to activate the CM. While a non-definitive test like connecting to Google may work, other services may fail if the quality levels are not agreeable; for example, streaming and telephony.

If the CM gets in the wrong hands, for example, if two CMs are swapped, then the swap may not be detected. If one CM has better service than the other, then the lower-service subscriber may complain and get a new CM later, but this will not prevent the higher-service subscriber from continuing to use a service he is not paying for.

In many cases, cable operators use English-readable names for the configuration files that are available through its TFTP servers. A subscriber who is assigned a configuration file associated to his subscription plan may guess the filename for the configuration file which grants him a better subscription plan. For example, he can "sniff" traffic to the TFTP and check what are the filenames being requested and infer which filename underlies a better plan. Next he can tamper with his cable modem so that it requests for this file while booting. Since there are no further controls in place, he may end with this "better" subscription plan; and what is more, the cable operator has no way of noticing this happened.

If the filenames served by the TFTP servers are guessable, then malicious users can choose to use a configuration file which entitles them to broadband and services different from those specified in his subscription (and at the cost of the operator). Therefore, there is a need in the industry to address one or more of the above mentioned issues.

SUMMARY OF THE INVENTION

Embodiments of the present invention provide a method and system for self-provisioning of cable modems and multimedia terminal adapters. Briefly described, the present invention is directed to a method for provisioning an unregistered cable modem in a cable operator network having a computer, a dynamic host configuration protocol (DHCP) server, a spoofing domain name system (DNS) server and a good DNS server, a captive portal application, and a trivial file transfer protocol (TFTP) server. The cable modem obtains a configuration, reboots, and activates the configuration. The computer obtains a plurality of computer configuration parameters including an IP address of the spoofing DNS. The spoofing DNS server answers an HTTP request from the computer with an IP address associated with the captive portal application. The captive portal obtains an activation code from the computer, verifies the activation code is correct, and forces the cable modem to reboot.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

Figure 1:
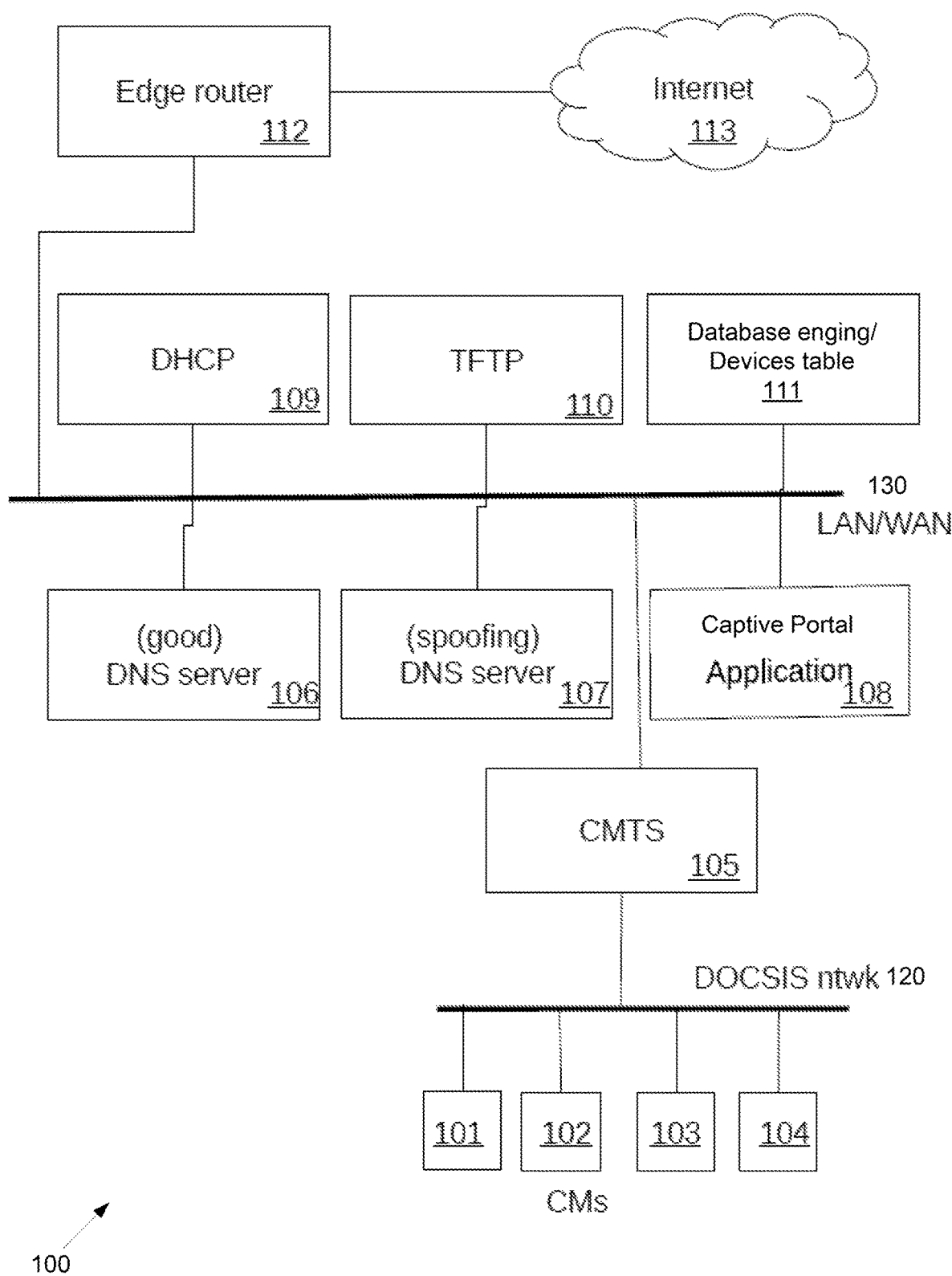
FIG. 1 is a schematic diagram of an exemplary first embodiment of a self-provisioning network with cable modems.

As used within this disclosure, a cable modem (CM) refers to a network device that allows a cable subscriber to connect a personal computer or access point to the Internet via a cable network, for example, elements 101, 102, 103 and 104 in FIG. 1.

Figure 2:
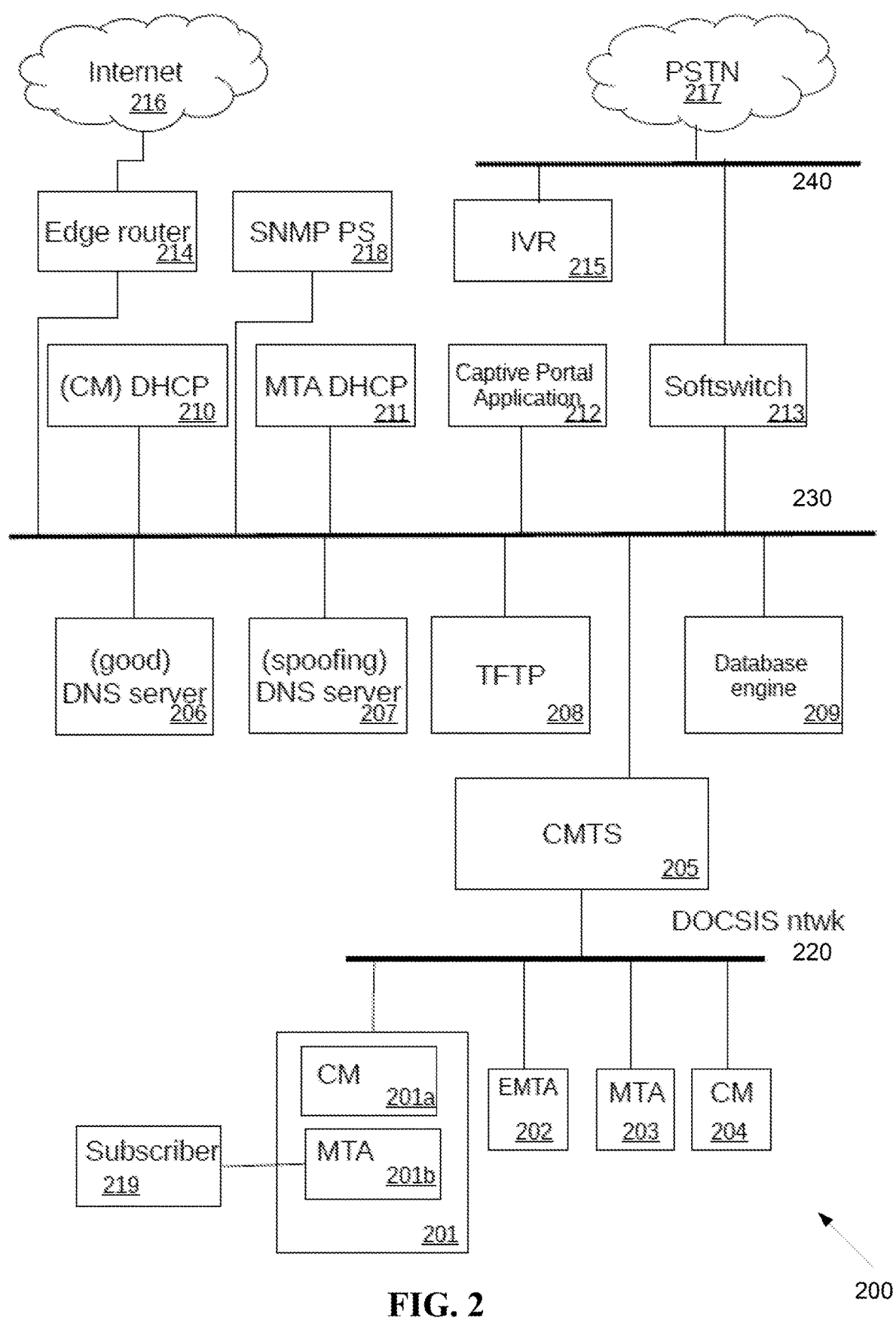
FIG. 2 is a schematic diagram of a second embodiment of a self-provisioning network with an eMTA containing a cable modem and an MTA.

As used within this disclosure, a multimedia terminal adapter (MTA) is a network device that allows a cable subscriber to connect a phone to a telephone network via the cable network, for example, element 203 in FIG. 2. An embedded MTA (or eMTA) (201, 202) is a device combining the functionality of a cable modem and an MTA.

As used within this disclosure, a database management system runs a database engine (111 and 209) which includes data related to the invention and at least the following tables (1) a devices table which associates the MAC address of a device with a subscription ID, (2) a to-be-activated subscriptions table whose rows consist in the fields: subscription ID, subscription plan name and activation code. Each subscription ID must have assigned one and only one activation code, (3) a subscriptions table which associates subscription IDs with subscription details for both broadband and telephone services, and/or (4) other tables.

As used within this disclosure, dynamic host configuration protocol (DHCP) refers to a standardized network protocol for Internet Protocol (IP) networks. One or more DHCP servers may be in charge of distributing network configuration parameters, such as IP addresses, for interfaces and services. The DHCP server instances within the embodiments described herein 109, 210, 211 may also execute code specific to the embodiments in charge of distributing certain parameters to cable modems, MTAs, eMTAs, and PCs. In particular, an embodiment of this system and method may use the DHCP server of one cable modem serving CMS and the DHCP server serving MTA. A DHCP server may store the public key associated to the TFTP's private key.

As used within this disclosure, a domain name system (DNS) server provides DNS services, where DNS is a hierarchical decentralized naming system for computers and other resources connected to the Internet or private networks. Preferably, a DNS 106, 206 server resolve names in the standard way. The embodiments disclosed within may make use of at least two DNS servers configured differently: a first DNS server which is configured as a standard DNS server, and a second, "spoofing" DNS 107, 207 server which may answer requests returning the IP address of the web server hosting the captive portal web application and assigns to this record a small validity (of, for example, less than one second), and optionally, a third DNS server used during MTAs provisioning.

As used within this disclosure, a public Switched Telephone Network (PSTN) 217 refers to an aggregate of the world's circuit-switched telephone networks that are operated by national, regional, or local telephony operators, providing infrastructure and services for public telecommunication.

As used within this disclosure, a softswitch, or software switch, or SSW 213 refers to a device in a telecommunications network which connects telephone calls from one phone line to another, across a telecommunication network or the public Internet, entirely by means of software running on a general-purpose computer system.

As used within this disclosure, a trivial file transfer protocol (TFTP) server (110 and 208) refers to a server that runs code specific to the described embodiment. In particular a TFTP server may validate a download request before answering. Also, a TFTP server may store the public and private key pair for an asymmetric cryptosystem referred to as the private key for the TFTP.

As used within this disclosure, an interactive voice response (IVR) system 215 is an application which allows a computer to interact with a human through the use of dual tone multi frequency (DTMF) tones (also known as "touch tones") input via the telephone keypad. The IVR may run over voice over IP (VoIP) and may be connected through a LAN network to the Captive Portal application and to the softswitch.

As used within this disclosure, an SNMP (simple network management protocol) provisioning server 218 is a server responsible for PacketCable hybrid provisioning flow compliance, receiving SNMP INFORM packets sent by MTAs during boot time, providing the MTA's configuration file name and security hashes, and sending or receiving other SNMP commands, among other functions.

As used within this disclosure, a personal computer (PC) is to be understood as any desktop, laptop, tablet or Internet-of-Things device (e.g., a refrigerator or a smart air conditioning system) that connects to the internet through the cable modem.

Reference will now be made in detail to embodiments of the present invention, examples of which are illustrated in the accompanying drawings. Wherever possible, the same reference numbers are used in the drawings and the description to refer to the same or like parts.

Figure 3:
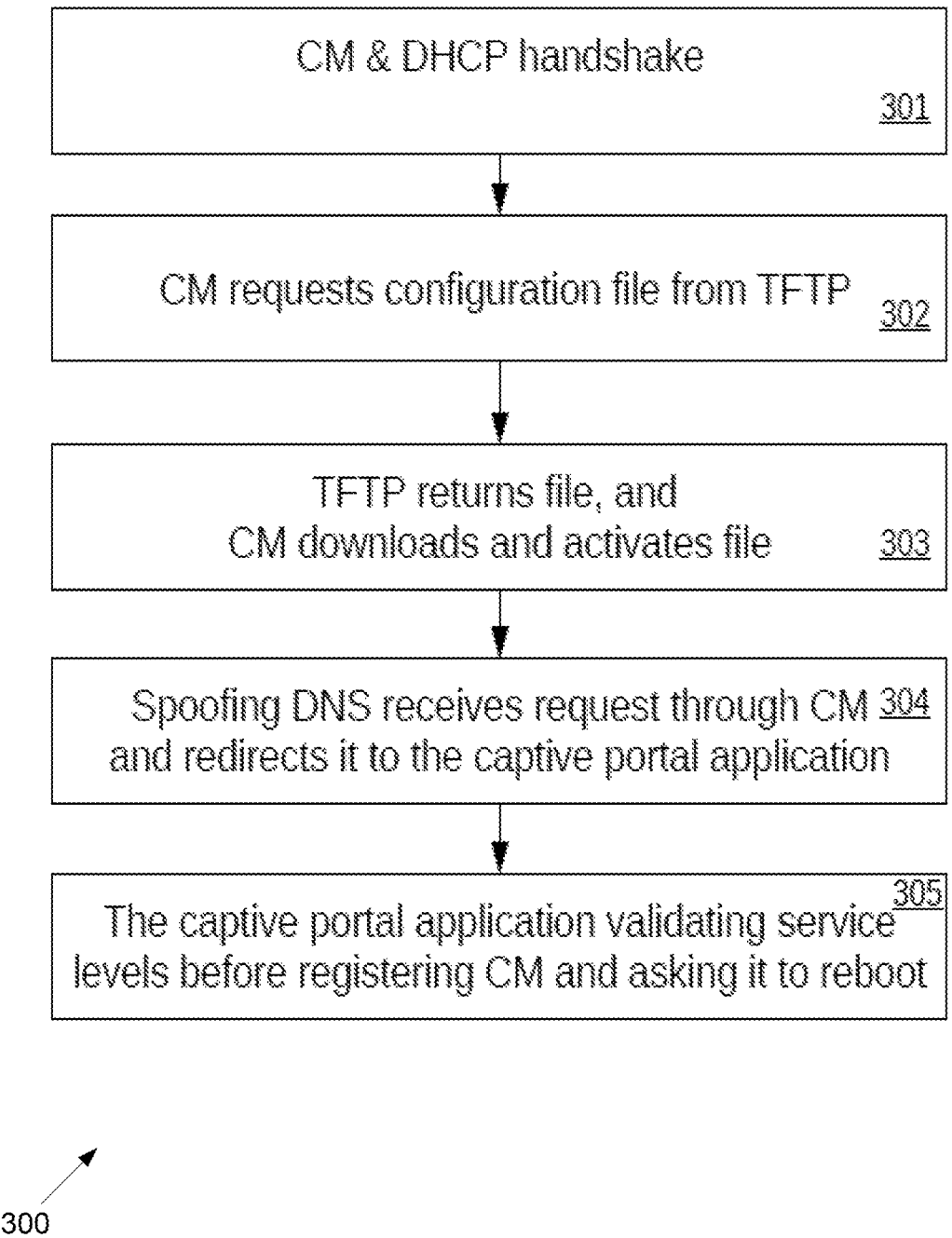
FIG. 3 is a flowchart showing an exemplary embodiment of a method for cable modem self-provisioning.
Figure 4:
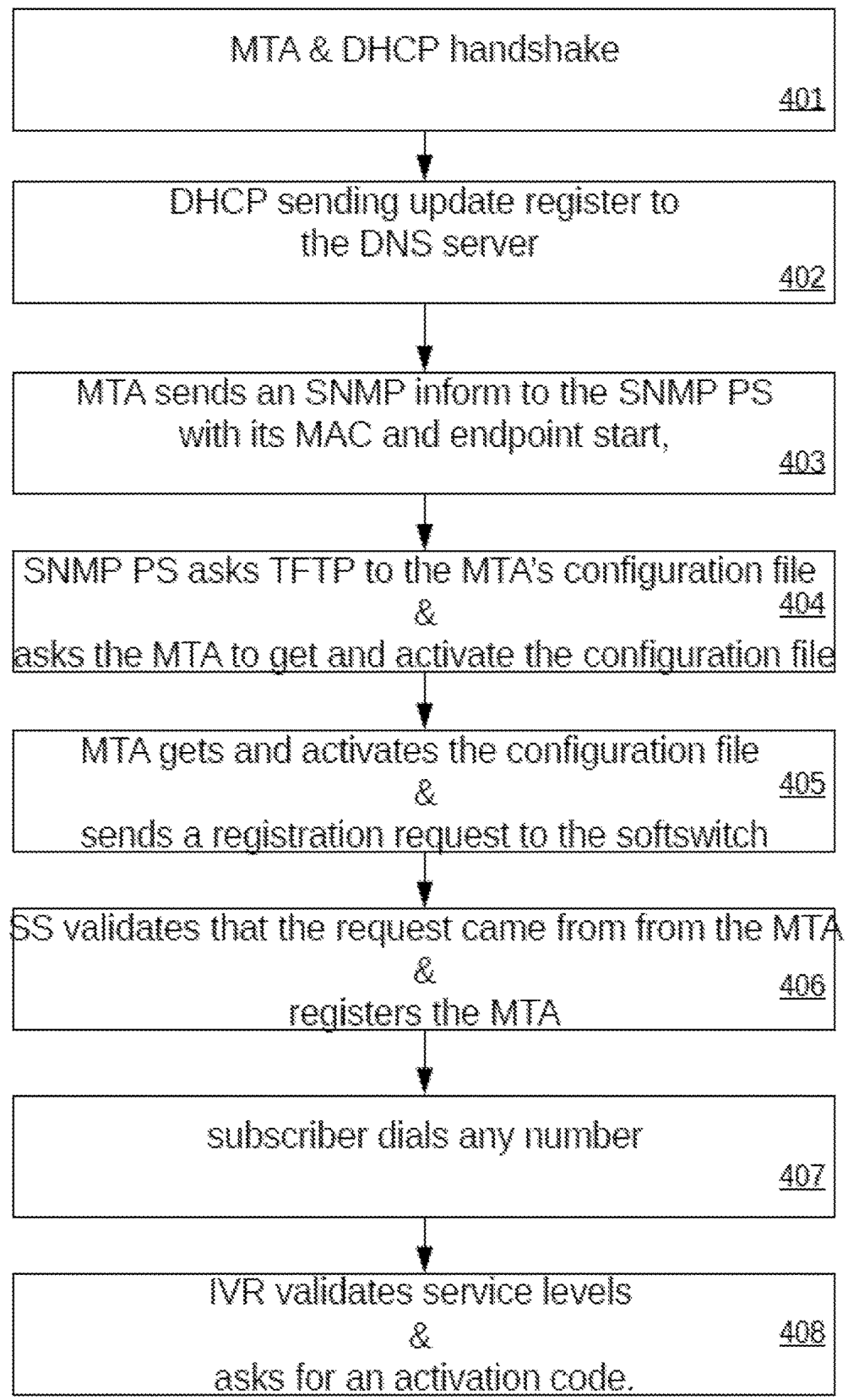
FIG. 4 is a flowchart showing an exemplary embodiment of a method for eMTA self-provisioning.

FIG. 3 is a flowchart 300 of an exemplary embodiment of a first method for self-provisioning a cable modem. The description of the first embodiment method may refer to the network 100 shown in FIG. 1. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. It should be noted that devices connected to the cable modems 101-104, such as PCs and other devices in a home/business network of the cable modem 101-104, have been omitted from FIG. 1 for simplicity.

For the first embodiment, it is assumed that when a subscriber to a cable service receives or buys a cable modem 101-104, this cable modem 101-104 is not pre-provisioned to link the subscriber to the cable service. For example, the cable modem 101-104 may have never connected to the LAN/WAN network 130 of the cable service, or if it has, its MAC address may or may not be not linked to another subscriber in a devices table in the database engine 111 of the cable service.

Upon booting, the cable modem 101-104 may perform a ranging negotiation with the CMTS 105 to obtain at least one upstream channel and one downstream channel. As shown by block 301, the CM and DHCP follow a handshake protocol. For example, if the network uses IPv4 (internet protocol version 4), then the handshake may be a 4-way protocol called DORA (Discover/Offer/Request/Acknowledge). For an IPv6 network, a Solicit-Reply handshake may be used. Regardless of the version, the protocols may be implemented with some additions that are particular to the first method embodiment.

For the DORA handshake, the cable modem 101-104 performs the discovery (D) portion of the DORA with the DHCP server 109. The cable modem 101-104 sends: its MAC address, the IP address of the CMTS 105 and other information encoded in fields which are called "options". For example, option 55 may include a request parameter list, option 43 may include: firmware version: vendor, model, hardware version, bootROM version, option 60 may include: what kind of device it is (for example, a cable modem, an eMTA, a DSG, an STB, a PC, Internet-of-Things device or any other Customer Premises Equipment with DHCP-client capabilities), supported DOC SIS versions, list of supported features (L2VPN, IPv6, how many IP filters it supports, among others).

For the offer (O) portion of DORA, the DHCP 109 first determines if the CM 101-104 had been previously activated. The DHCP 109 reads the MAC address of the CM 101-104 and queries the devices table in the database engine 111 with this value. If the devices table in the database engine 111 has an entry for this MAC, it means the CM 101-104 had been activated earlier, otherwise the DHCP 109 infers that the CM 101-104 has not been activated. In the latter case, the DHCP 109 returns an "offer" string that consists of: an IP address to be used by the cable modem, "option-3": IP of the gateway; the subnet mask, "option-122": IP address for the DHCP 109 used by the MTA; TFTP server 110 IP address; and a configuration filename. The configuration filename is computed by the DHCP 109 in two steps: first the DHCP 109 concatenates timestamp, device type (CM or MTA) which is obtained as part of the "option-60", and MAC address to form a string; next, it encrypts this string with the (preconfigured) public-key cryptosystem using the TFTP's 110 public key. If the CM 101-104 was not activated, the IP address assigned to the CM 101-104 may either be set arbitrarily or set within a special network segment for deactivated cable modems; moreover, the configuration file may include an access list (IP filters) that will allow only provisioning traffic (e.g., block all DNS traffic that doesn't go to the spoofing DNS server, block HTTP/HTTPS packets that don't come and go to the captive portal application, etc).

For the request (R) portion of DORA, the CM 101-104 validates these parameters and if the validation is passed, the CM 101-104 requests registration from the DHCP 109. For the acknowledge (A) portion of DORA, the DHCP 109 answers that it acknowledges the registration request from the CM 101-104. If the DHCP does not acknowledge the request, the protocol is replayed.

As shown by block 302, the CM 101-104 requests the configuration file from the TFTP 110 using the TFTP IP address and the (encrypted) filename that it received from the DHCP 109. A shown by block 303, the TFTP 110 receives the filename request from the cable modem 101-104. The TFTP 110 decrypts the filename request and splits the result into 3 values: a) timestamp; b) device type; and c) MAC address. The device type and MAC address may be concatenated to form a new string for a file the device wants to obtain from the TFTP 110. The TFTP 110 verifies that the time elapsed between timestamp and the present does not exceed a pre-configured threshold, of for example, 5 minutes. It is noted, that 5 minutes is merely used herein as an example, and the present system and method is not limited to a specific time period for the pre-configured threshold. If the threshold has been exceeded, then the filename request is ignored. Otherwise, the TFTP 110 queries the devices table 111 and learns if this CM 101-104 has been activated. Next, the TFTP 110 may query the database engine 111 to check what configuration needs to be assigned to this CM 101-104 (e.g., upstream and downstream rates, what CM vendor and model, etc.) and with this values the name of a configuration file specifically suited for this device and parameters. This can be a file for the de-activated CM 101-104 or for an activated CM 101-104 (they are different). If the requested file is in the file system of the TFTP 110, and if the TFTP 110 reads file metadata and infers that it has been updated to its latest version, then the file is returned. Otherwise, the TFTP 110 may generate this file on the fly based on the subscription type underlying this CM 101-104. That is, the TFTP 110 may include logic that can dynamically construct the configuration file. If the configuration file is for a deactivated cable modem, then in particular, it includes an access list which only allows access to the IP address of the "spoofing" DNS server. The CM 101-104 downloads the file, reboots (thus activating the configuration) and performs the ranging with the CMTS 105.

As shown by block 304, the PC attached to the CM 101-104 and the DHCP 109 perform another handshake (DORA or Solicit-Reply, same as before). In this step the PC, which now can connect to the LAN/WAN 130, interacts with DHCP 109 to get some network configuration parameters. In particular, the DHCP 109 returns the IP address of the "spoofing DNS" server 107 in the DNS server field, and a list of IP filters it should implement. The spoofing DNS server 107 is preferably used by the PC for all its DNS queries until the configuration is changed. When the PC makes any HTTP request to any URI for ports which are associated to web applications (e.g., 80 and 443), the spoofing DNS server 107 answers with the IP address for the web server hosting the captive portal application 108. All other requests may be ignored.

As shown by block 305, a request reaches the captive portal web application 108, and the captive portal application 108 verifies the quality levels of the connection (for example, the captive portal application 108 queries CMTS 105 and CM 101-104 to validate that the CM 101-104 has the latest firmware version, that the power levels and signal-noise are those homologated, et cetera). If the quality levels are not those homologated, the captive portal can show a message asking the subscriber to contact a technician and explain that the activation process will be stopped until the service levels are agreeable. Otherwise, the captive portal application 108 displays a webpage in which the subscriber is asked to insert his subscription number and activation code. It may be assumed that the client has been given an "activation code" by the cable provider. (Alternatively, the captive portal application 108 may display a telephone number and the subscriber may call this number and interact with an IVR in order to get the activation code.) Once the subscriber enters the activation code, the captive portal application 108 queries the to-be-activated subscriptions table, verifies if the activation code is available, and retrieves the subscription ID underlying this activation code. The captive portal application 108 knows the IP address of the PC making the request, with which the captive portal application 108 may query the DHCP 109 for the MAC address of the CM 101-104 that the PC connects to, and hence can associate the MAC address of the CM 101-104 with the subscription ID. This association is inserted into the devices table 111.

Finally, the captive portal forces the CM 101-104 to reboot using a SNMP command (the cable modem hosts an SNMP agent which allows this). Once the CM 101-104 reboots, the whole process runs again, but with some changes which we describe in what follows. When the handshake starts, the DHCP server 109 immediately learns that the CM 101-104 has been activated, but notices it has the wrong (non-updated) configuration file. The CM 101-104 then is forced to replace its configuration file, which is tailored for an unregistered cable modem, with a "production configuration file" specifically tailored to the subscription it is linked to. That is, the CM will be provided with the name of this new configuration file so it can download and activate this file from the TFTP. Next, the PC gets assigned a good DNS server 106 when performing the handshake with the DHCP server 109 and no IP filter. Hence, once the process finishes, the CM 101-104 and computers behind it can make use of the broadband service for their subscription.

Every other time the CM 101-104 reboots, the handshake is performed and at this time the DHCP 109 notices that the CM 101-104 has been registered and contains the correct configuration file. It is thus given an IP address and can use the good DNS server 106 and use the full subscription services.

FIG. 2 shows a network for executing a second embodiment, including an eMTA 201 hardware device contains a cable modem component 201a and a multimedia terminal adapter 201b, where the multimedia adapter connects to the telephony service 200 network through the cable modem 201a. The MTA 201b may be configured using the basic, hybrid or secure flows, for example, as described in "PacketCable 1.5 Specification—MTA Device Provisioning (PKT-SP-PROVI.5-104-090624)" by PacketCable, which is incorporated herein by reference in its entirety. The following describes how a second embodiment method 400 with reference to the system 200 works with the Hybrid Flow. The operation under the basic mode may be inferred mutatis mutandis.

As shown by block 401, the cable modem 201a within the eMTA 201 performs a ranging negotiation with the Cable Modem Termination System (CMTS) 205 to obtain at least one upstream channel and one downstream channel. The CM 201a and the DHCP 210 of the CM 201a perform the handshake protocol described above in the first method embodiment. In the process, the DHCP server 206 learns this CM 201a is unregistered and is assigned a configuration filename as described above in the first method embodiment.

The CM 201a requests and downloads a configuration from the TFTP server 208 using an encrypted filename repeating the process described above. The CM 201a loads this configuration and finishes its boot process. Once done, the CM 201a is configured with an IP address in the network segment for deactivated cable modems, it is assigned to the spoofing DNS server 207 and other configuration details described regarding the first embodiment, as shown by block 402.

The MTA 201b and the DHCP 211 associated with the MTA 201b perform a standard DORA/Solicit-Reply handshake. The protocol is similar to that used between CM 201a and the DHCP 210 of the CM 201a with the exception that no configuration filename is constructed or downloaded. The MTA 201b obtains an IP address, same as before, and some new attributes in the "option 122" parameter, which include a fully-qualified domain name (FQDN) for a SNMP provisioning server 218, the IP address of a DNS server (this can be the public DNS in the Internet (216) or one used only for telephony), an FQDN that both serves as a unique identifier of this MTA 201b and also allows to identify this MTA as unregistered. If the MTA 201b has not registered yet, then it receives a FQDN for a temporary line which has special properties. At this step, the DHCP 211 sends an "update register" command to the DNS which includes the FQDN for the MTA 201b and its IP address.

The MTA 201b queries the DNS 206 for the IP address associated to the FQDN of the SNMP provisioning server it received in the previous step, as shown by block 403. The DNS server answers with the SNMP provisioning server's IP address. Using the IP address, the MTA 201b sends an SNMP inform command to the SNMP provisioning server 218. The "inform" includes the MTA's MAC address and the endpoint start. The endpoint start stands for a numeric identifier equal to the "ifIndex" of the first telephony interface, for example, a jack. (Preferably, the subscriber hooks his telephone to the first jack available, in order to go over the activation process, the eMTA has two or more jacks for connecting a telephone, and the subscriber purchases two or more telephone lines.)

As shown by block 404, the SNMP Provisioning Server 218 receives the SNMP inform request, and asks the TFTP server 208 to prepare the configuration file for this MTA 201b (this means that TFTP server 208 must check if the file is available, and create the file if it is not available). After this, if the file is available, the TFTP server 208 answers to the SNMP provisioning server 218 with an SHA-1 hash of the file and its filename. In turn, the SNMP provisioning server 218 performs an SNMP set on the MTA 201b to set two values: the configuration file URI (e.g., tftp://120.12.3.45/filename123765abc89) and the SHA-1 hash of the file it received from the TFTP server 208. The configuration filename is computed, as described above, by concatenating timestamp, device type and MAC address.

As shown by block 405, once the values are set, the MTA 201b requests the file with the given URI from the TFTP server 208. After the file has been downloaded, the MTA 201b computes the SHA-1 hash of the file and compares it against the received value. If the has values agree, then the MTA 201b activates this configuration; otherwise, it is ignored. Also, within the configuration file is the FQDN for the softswitch 213 which is used as described below.

As shown by block 406, the MTA 201b queries the DNS 206 for the IP address of the softswitch 213 using the FQDN of the softswitch 213. The DNS 206 returns the IP address. The MTA 201b sends a command to register in the softswitch 213 and provides it with its own FQDN. On one hand, the softswitch 213 takes note of the IP address of the MTA 201b sending the packet. On the other hand, the softswitch 213 may query the DNS 206 for the IP address belonging to the FQDN it just received. Then it compares the IP addresses and validates only if they are equal. (This ends the registration in the softswitch 213. The subscriber may pick up the telephone and listen to a dial tone.)

As shown by block 407, the subscriber may pick up the phone connected to the first interface in the MTA 201b and dial any number. The softswitch 213 realizes that the FQDN of the phone is associated with a temporary line and redirects the phone call to the provisioning IVR 215.

As shown by block 408, the provisioning IVR 215 is connected to the softswitch 213. When the IVR 215 receives a call, it can read the Caller ID of the MTA 201b that is calling and retrieve its associated MAC address from the database (and next, what is the MAC of the CM 201a associated to this MTA 201b). The IVR 215 validates that the quality levels are as expected: this is done by executing SNMP commands against the CM 201a, MTA 201b and CMTS 205. If the validation is not passed, the IVR 215 informs the subscriber that it cannot continue until problems are fixed. If the validation is passed, then the process continues. The IVR 215 asks the caller for the activation code. Once the caller dials an activation code, the IVR 215 queries the to-be-activated devices table and verifies if the activation code is valid. If the activation code is valid, the IVR 215 receives from the database the subscription ID associated to this activation code. The IVER 215 then associates subscription ID with MTA MAC address in the database; also, it can retrieve the phone number and store the FQDN-phone number association in the directory table in the database. The IVR 215 uses an SNMP command to reboot the eMTA 201.

Once the process is restarted, the protocol starts to execute: the CM 201a does the ranging with the CMTS, the CM 201a executes the DORA/Solicit-Reply protocol with the DHCP only that this time it is answered with the IP address and configuration file underlying an activated subscription, then the MTA 201b performs DORA/Solicit-Reply with the DHCP and analogously gets a valid configuration file (with the FQDN in the production network segment).

If there is more than one line in the MTA 201b, then the activation is performed in the first interface (e.g. the first RJ11). The configuration file received in the end of the activation process activates all the phone numbers for the subscription associated to the eMTA device. If both PC and MTA 201b are available and connected to the eMTA 201, then the cable operator may configure the invention to force the subscriber to use the MTA 201b provisioning methodology or can allow him to choose between the two possibilities. MTA 201b is better. This is because it does not rely on a PC connected to the CM 201a and running.

Figure 5:
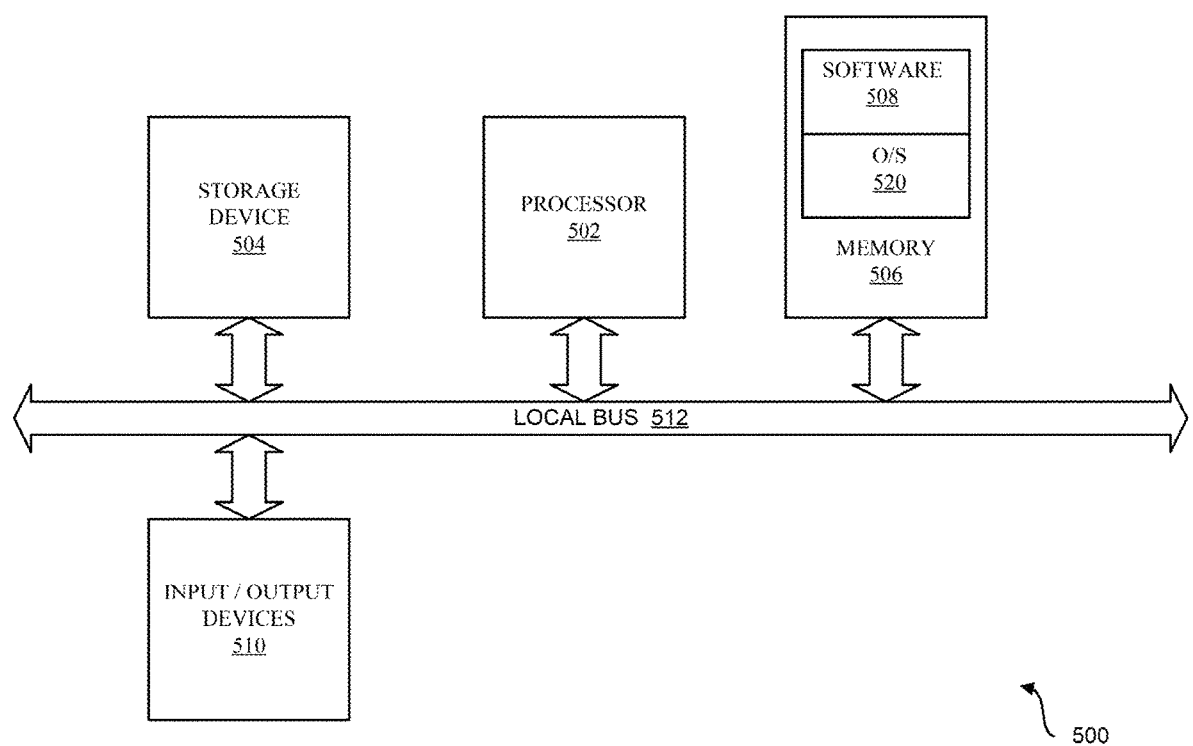
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for provisioning an unregistered cable modem in a cable operator network comprising a computer, a dynamic host configuration protocol (DHCP) server, a spoofing domain name system (DNS) server and a good DNS server, a captive portal application, and a trivial file transfer protocol (TFTP) server, the method comprising the steps of:

the cable modem obtaining a configuration file for an unregistered cable modem comprising a configuration, rebooting, and activating the configuration;

the computer obtaining a plurality of computer configuration parameters comprising an IP address of the spoofing DNS;

answering, by the spoofing DNS server, a HyperText Transfer Protocol (HTTP) request from the computer with an IP address associated with the captive portal application;

obtaining, by the captive portal, an activation code from the computer and verifying the activation code is correct;

if the activation code is correct, forcing, by the captive portal, the cable modem to reboot; and marking, by the captive portal application, the cable modem as registered; and the cable modem, once marked as registered, receiving a replacement configuration which includes a good DNS, wherein the replacement configuration replaces the configuration.

2. A method for provisioning an unregistered cable modem in a cable operator network comprising a computer, a dynamic host configuration protocol (DHCP) server, a spoofing domain name system (DNS) server and a good DNS server, a captive portal application, and a trivial file transfer protocol (TFTP) server, the method comprising the steps of:

the cable modem obtaining a configuration file for an unregistered cable modem comprising a configuration, rebooting, and activating the configuration;

the computer obtaining a plurality of computer configuration parameters comprising an IP address of the spoofing DNS;

answering, by the spoofing DNS server, a HyperText Transfer Protocol (HTTP) request from the computer with an IP address associated with the captive portal application;

obtaining, by the captive portal, an activation code from the computer and verifying the activation code is correct and if the activation code is correct, forcing, by the captive portal, the cable modem to reboot, wherein the cable modem obtaining the configuration file further comprises steps of:

the DHCP server computing an encrypted filename for the configuration file and sending the encrypted filename to the cable modem;

requesting, by the cable modem, the configuration file via the encrypted filename, from the TFTP server;

validating the encrypted filename by the TFTP server; and providing, by the TFTP server, the configuration file to the cable modem, wherein computing the encrypted filename further comprises encrypting the device identification parameters identifying the cable modem and a timestamp indicating a time of the computing.

3. The method of claim 2, further comprising:

decrypting by the TFTP server the encrypted filename; and validating, by the TFTP server, that a time elapsed since the timestamp is not greater than a pre-configured threshold.

4. A method for provisioning for a subscriber an embedded multimedia terminal adapter (eMTA) comprising a cable modem in a cable operator network comprising, a phone connected to a multimedia terminal adapter (MTA) portion of the eMTA, a dynamic host configuration protocol (DHCP) server, a domain name system (DNS) server, a captive portal application, and a trivial file transfer protocol (TFTP) server, a (simple network management protocol) (SNMP) provisioning server, and a softswitch, and an interactive voice response (IVR), the method comprising the steps of:

the cable modem obtaining a configuration file for an unregistered cable modem, rebooting and activating this configuration;

the MTA obtaining a plurality of configuration parameters comprising an FQDN of the softswitch;

the MTA requesting registration from the softswitch;

the softswitch receiving a phone call request from the MTA and redirecting the call to the IVR;

verifying, by the IVR, a quality level of a connection and asking for an activation code;

forcing, by the SNMP provisioning server, the cable modem to reboot;

the cable modem executing a handshake protocol with the DHCP server with the cable modem obtaining the FQDN of the SNMP provisioning server;

the MTA sending an SNMP inform to the SNMP provisioning server;

the SNMP provisioning server computing a filename for the MTA, asking the TFTP to prepare a configuration with the filename, and asking the MTA to download and activate the configuration;

the MTA downloading the configuration file from the TFTP server and activating the configuration.

5. The method of claim 4, further comprising:

rebooting the cable modem;

downloading the replacement cable modem configuration file and activating the replacement cable modem configuration by the cable modem; and obtaining an MTA replacement parameter.

6. The method of claim 4, further comprising:

upon receiving the registration request by the softswitch and FQDN of the MTA, querying by the softswitch the DNS for the IP address associated with the FQDN of the MTA; and comparing the IP address associated with the FQDN of the MTA with an IP address of the registration request.

7. The method of claim 4, further comprising:

querying by the IVR a to-be-activated devices table; and verifying by the IVR the activation code is valid.

* * * * *